United States Patent [19]
Lee

[11] 3,736,480
[45] May 29, 1973

[54] BATTERY RUN D-C MOTOR SPEED CONTROL, CHARGING AND STEERING SYSTEMS

[76] Inventor: Joo C. Lee, c/o Temptron, Inc., 1684 S. Wolf Road, Wheeling, Ill. 60090

[22] Filed: Feb. 11, 1972

[21] Appl. No.: 225,565

[52] U.S. Cl. .................... 318/51, 318/107, 318/139, 320/59, 321/2
[51] Int. Cl. ........................... H02m 3/14, H02p 5/46
[58] Field of Search ....................... 318/51, 105, 106, 318/107, 108, 109, 139, 339, 341; 320/48, 57, 59, 60; 321/2

[56] References Cited

UNITED STATES PATENTS

| | | | |
|---|---|---|---|
| 3,551,774 | 12/1970 | Rusch | 318/139 X |
| 3,575,648 | 4/1971 | Ridding | 318/106 |
| 3,614,586 | 10/1971 | King | 321/2 |
| 3,702,959 | 11/1972 | LeGloan | 318/139 |

Primary Examiner—J. D. Miller
Assistant Examiner—H. Huberfeld
Attorney—James J. Jennings, Jr.

[57] ABSTRACT

A first system for energizing a d-c motor includes a switching network for passing energy to and from a battery, and to the d-c motor. The battery can energize the motor over the switching network, and the battery can be recharged over a first channel supplied with a-c energy which is rectified and passed through the switching network to the battery. A second channel provides power control to regulate the level of d-c energy to the motor and thus control motor speed, and also provide an indication of the battery power available. A third channel energizes an r-f oscillator over the switching network from the battery. The a-c voltage from the r-f oscillator is rectified, filtered and applied to an alternate d-c motor.

Another system includes a pair of d-c motor groups, with two separate channels for energizing each motor group simultaneously or independently. This provides a steering function in addition to the optional battery charging speed control arrangements already described.

18 Claims, 9 Drawing Figures

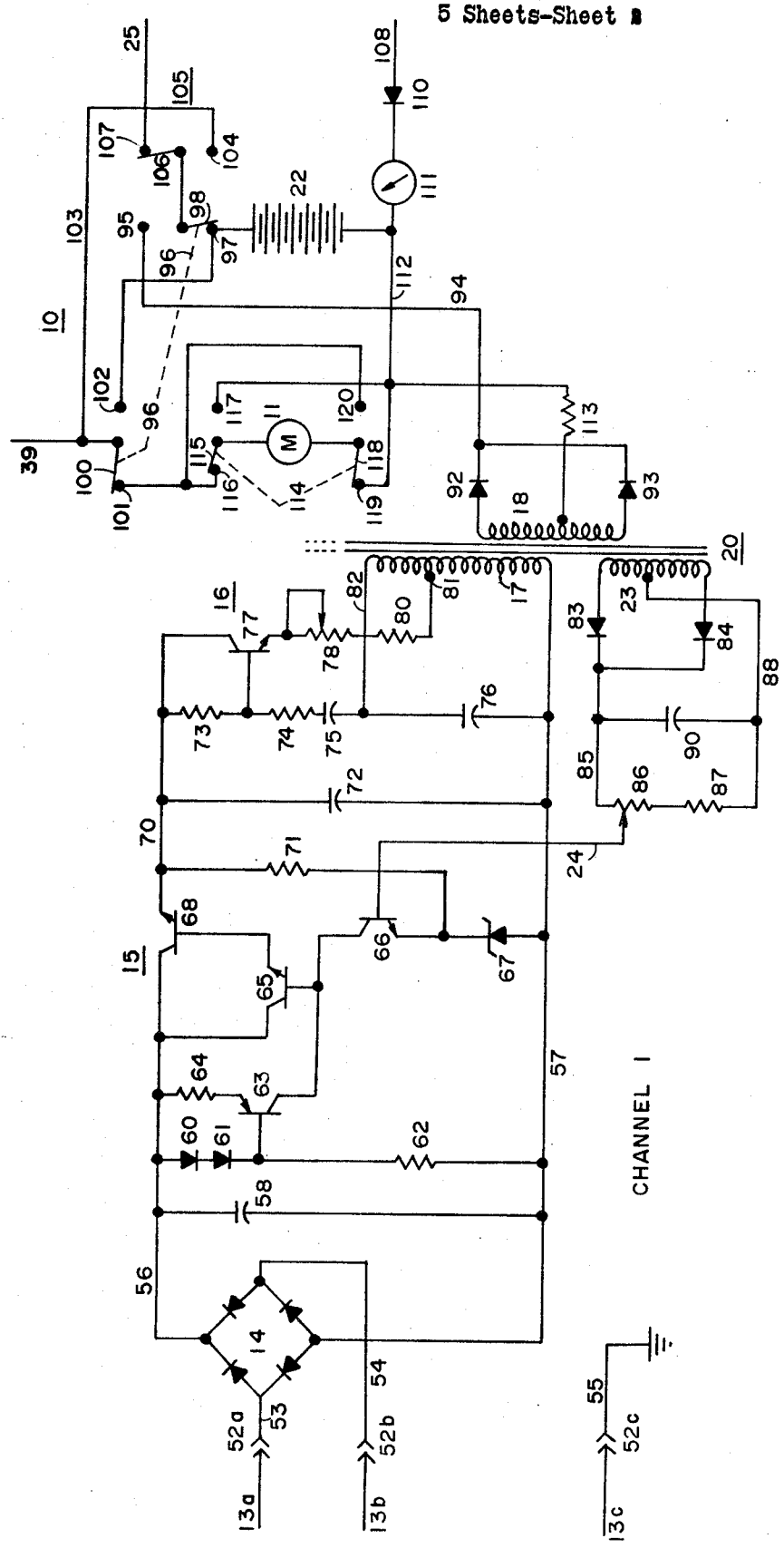
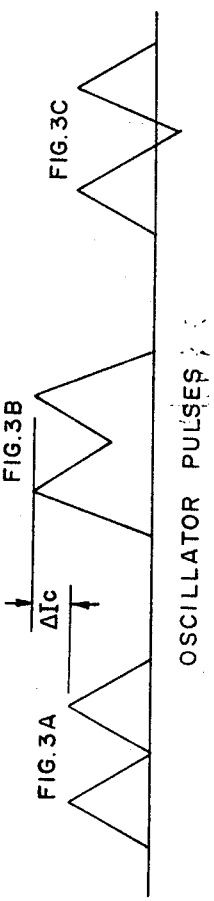
FIG. 2

Patented May 29, 1973

BATTERY RUN D-C MOTOR SPEED CONTROL, CHARGING AND STEERING SYSTEMS

BACKGROUND OF THE INVENTION

There are many areas in which small, fractional horse-power d-c motors are useful. One such area is the sporting goods field, in which small electrical motors are used on boats for trolling. However some provision must be made for recharging the battery in an efficient manner when the boat returns to the dock. It is also desirable to have some form of speed control, even at the low operating levels of trolling motors. At the present time an efficient solution of these problems has not been attained, and it is therefore a prime consideration of the present invention to produce an efficient d-c motor energization system with effective battery recharging, with the lowest ratio of volume [or weight] to the volt-ampere capacity, and with power level control of the energy passed to the motor to regulate the motor speed.

It is another important consideration of the invention to provide an indication of two conditions, that power is being supplied to the power stages, and that the power stages are in fact operating.

Still another important consideration is the provision of a two-motor-group system, to allow steering as well as propulsion.

SUMMARY OF THE INVENTION

A system for regulating energization of a d-c motor from a battery, and also for regulating charging of the battery, comprises in a first embodiment separate channels for regulating the different functions. A switching network is coupled both to the battery and to the motor to regulate the passage of energy to the motor, and to and from the battery. A first channel is coupled between an a-c input line and this switching network. The first channel includes an input rectifier coupled to the a-c input line, and an oscillator or inverter for providing a-c energy as it receives d-c energy from the input rectifier. This a-c energy is passed over first and second windings of a transformer to another rectifier, which converts the energy to d-c and passes it to the switching network for charging the battery. A second channel is connected to receive constant level d-c energy from the switching network and return a variable level energy to regulate the motor energization level and thus control motor speed. The second channel may include an indicator feature which only responds to the presence of two conditions, the receipt of d-c energy from the switching network, and the suitable operation of the second channel for providing the variable power level. Another feature which may be incorporated in the first channel is a feedback arrangement which senses the flux level in the transformer over a feedback winding, thus accomodating operation to changes in load and making the regulation function independent of losses in the oscillator or inverter. A third channel can be added to return energy from the battery over the switching network and another oscillator-converter-filter arrangement for energizing a second d-c motor.

In accordance with another aspect of the invention, a pair of motors can be utilized for situations where, as in the propulsion of a boat, steering can be accomplished with the motors driven at different speeds. Two separate channels are then provided, one for regulating the energization of each motor. An appropriate steering switch is utilized to obtain the steering function.

THE DRAWINGS

In the several figures of the drawings, like reference numerals identify like elements, and in the drawings:

FIG. 2 is a schematic diagram setting out circuit details of a portion of the system shown generally in FIG. 1;

Figure 4A:
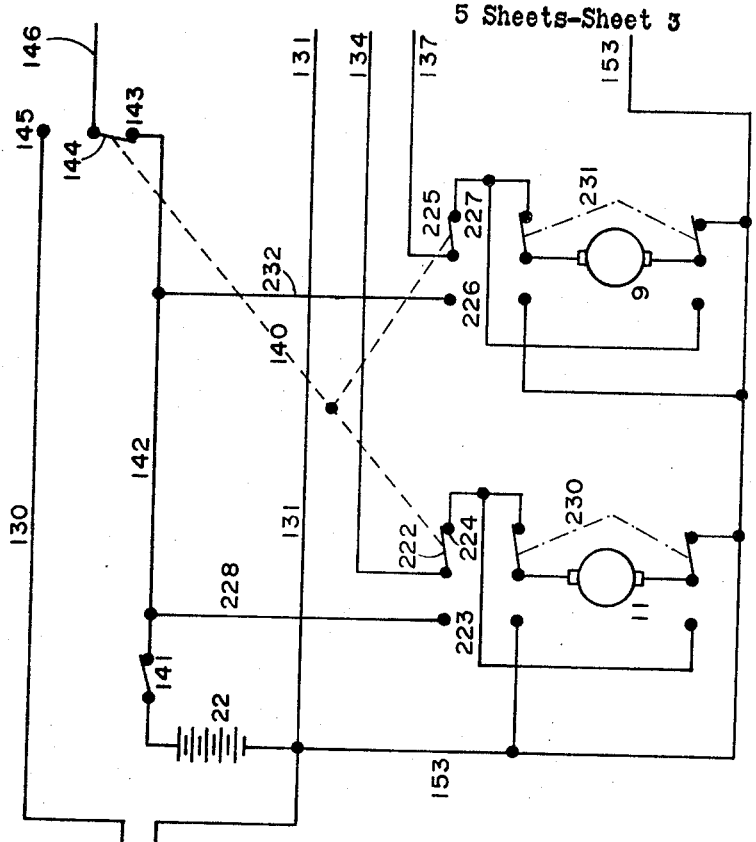
Figure 5:
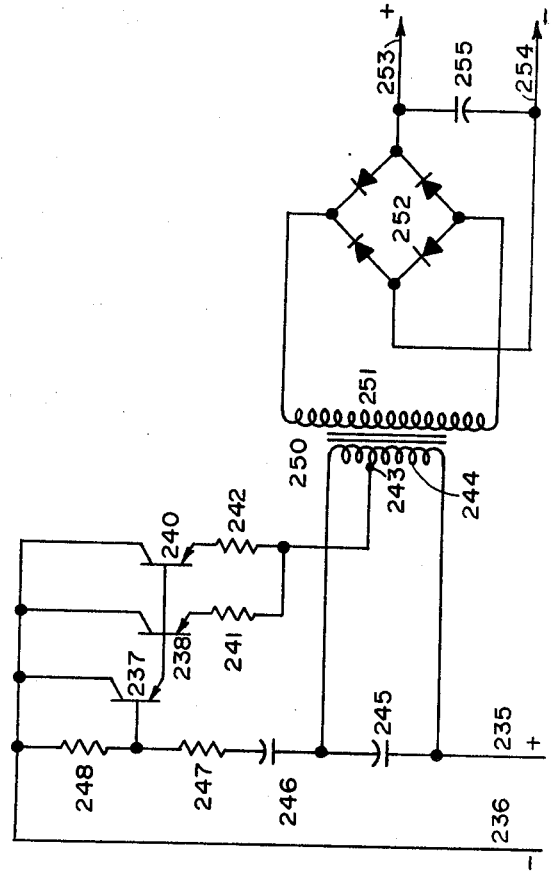
Figure 4B:
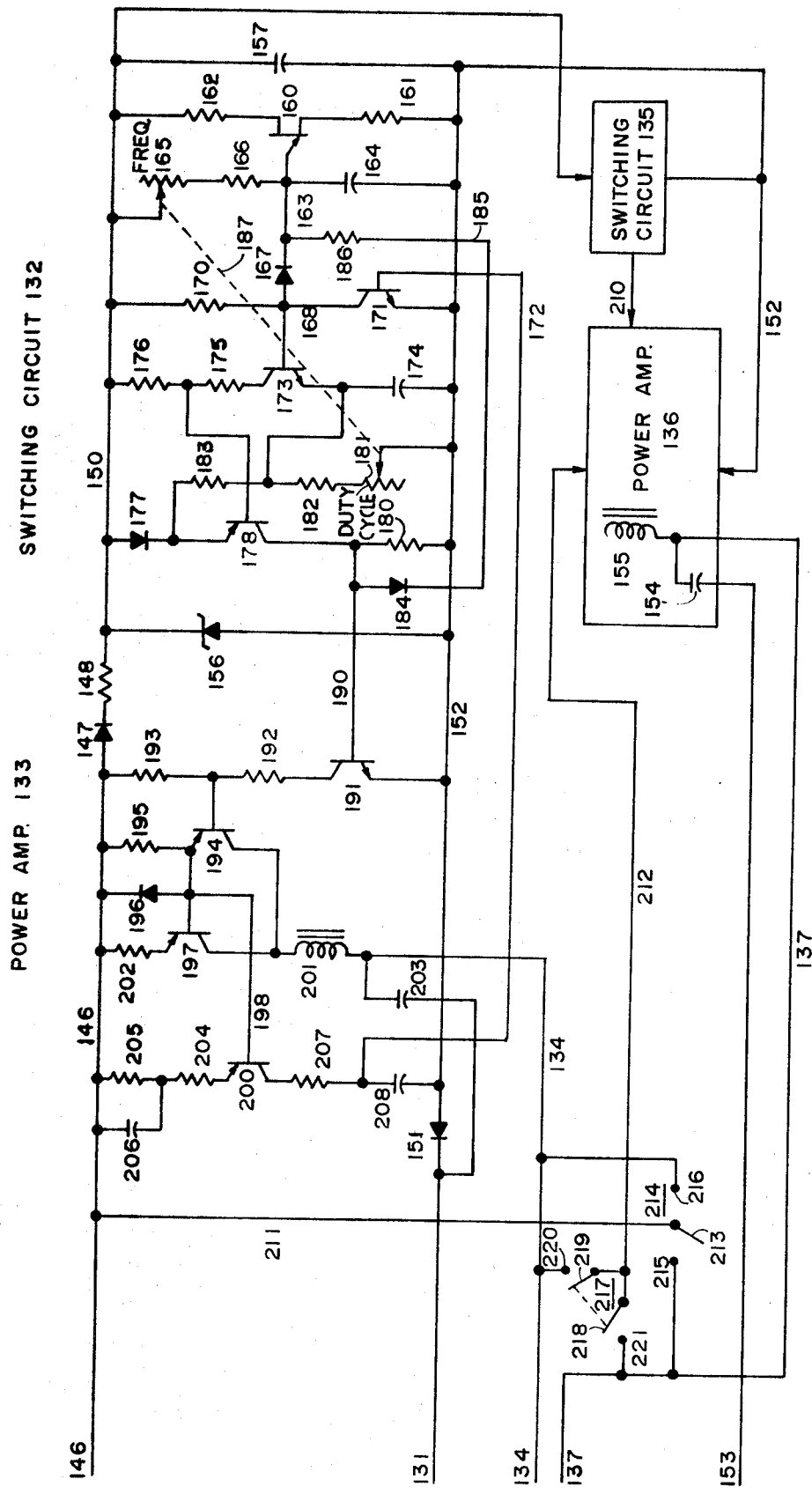

FIGS. 3A, 3B, and 3C are graphical representations useful in understanding the operation of the system shown in FIG. 2;

FIGS. 4A and 4B are schematic diagrams which, taken together, illustrate a system arrangement for the two-motor embodiment with steering; and FIG. 5 is a schematic diagram of an oscillator-converter arrangement for powering a universal motor from the system battery.

GENERAL SYSTEM DESCRIPTION

Figure 1:
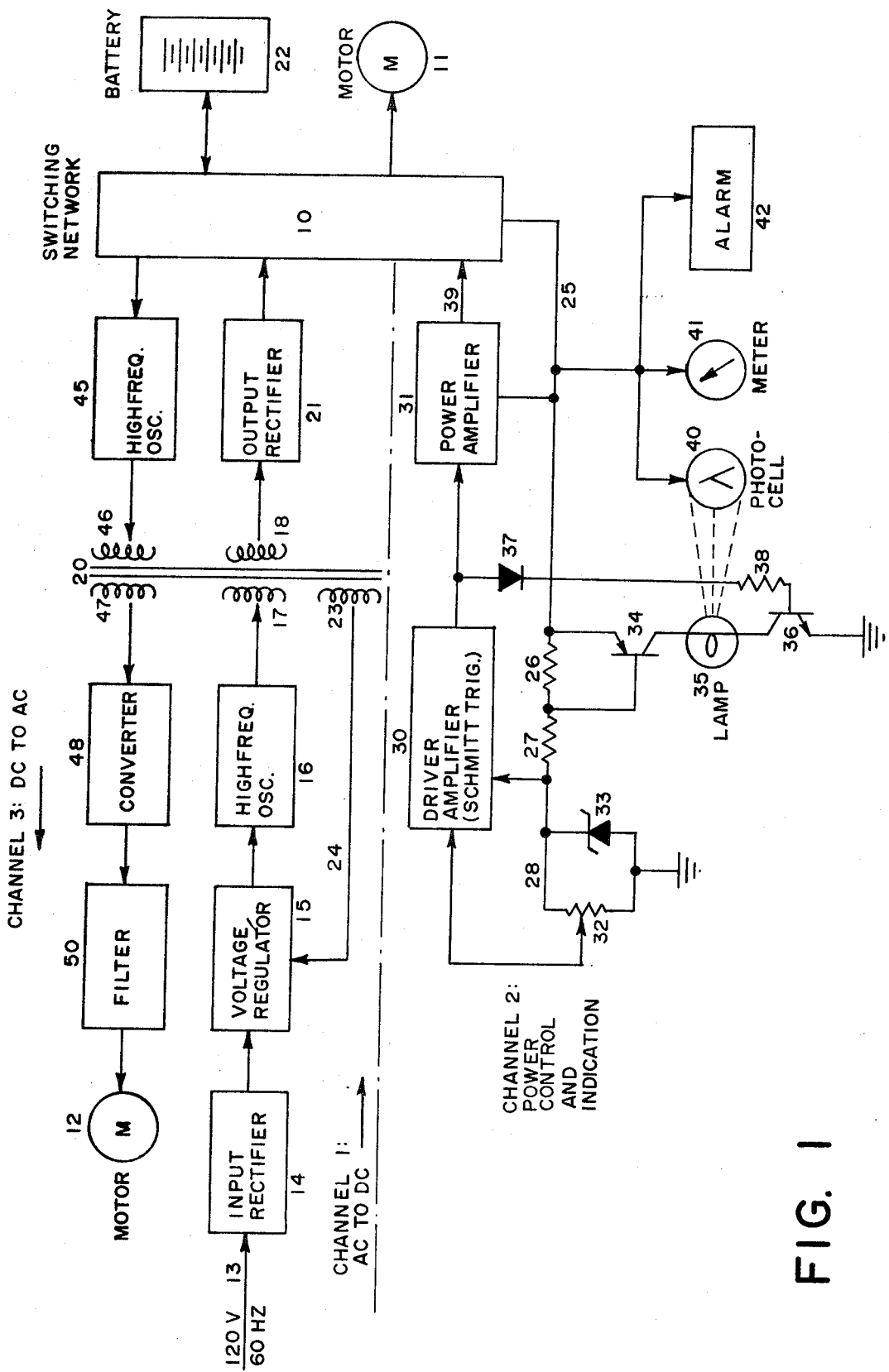
FIG. 1 is a block diagram of a first embodiment of the invention including a switching network for regulating the power transfer functions.
Figure 6:
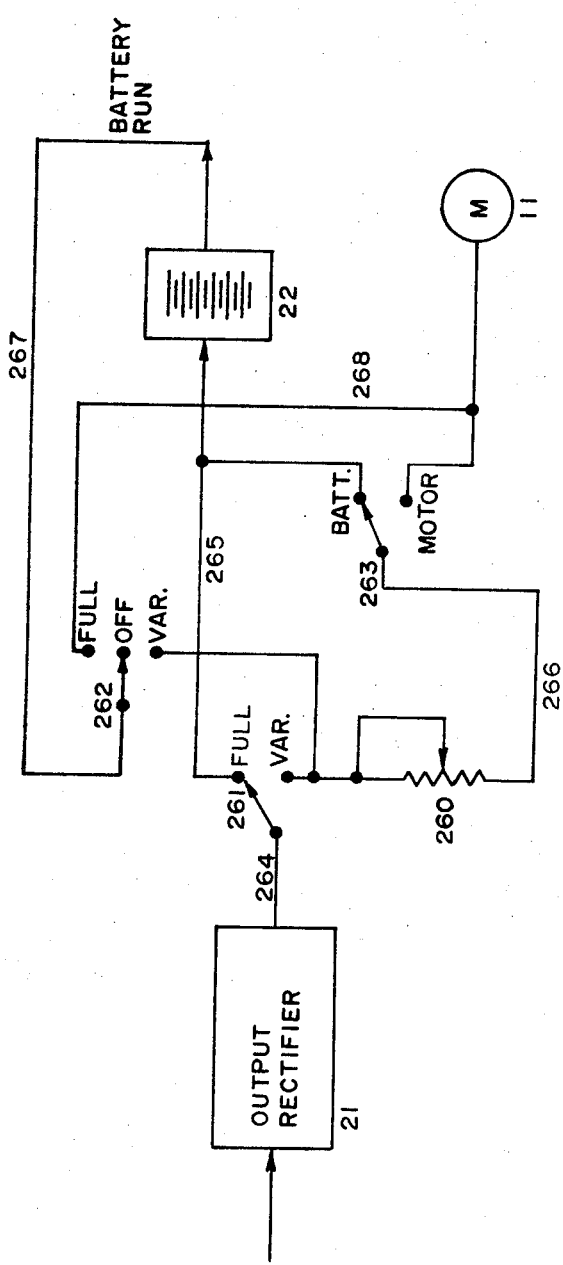

FIG. 6 shows an embodiment in which a rheostat replaces Channel 2 of FIG. 1.

FIG. 1 shows a general system arrangement for power transfer over a switching network 10 to energize either a first d-c motor 11 or a second d-c motor 12. With 120 volts, 60 hertz energy available, input line 13 can pass this energy over the components in Channel 1 including input rectifier 14, voltage regulator 15, oscillator 16, primary winding 17 and secondary winding 18 of the multiwinding transformer 20, and output rectifier 21 to the switching network 10. The d-c energy at the output side of rectifier 21 can be passed over network 10 and utilized to charge battery 22. During the charging operation voltage control in Channel 1 is provided by a circuit including a feedback winding 23 of transformer 20, which passes a signal over line 24 to voltage regulator 15 to insure the appropriate voltage level is established for the oscillator. The term "oscillator," as used herein and in the appended claims, means a circuit for providing an r—f a-c output signal when energized by a d-c voltage. Thus "inverter," "switching circuit," or other similar terms are generally interchangeable with "oscillator" as used herein.

An important part of the energy supply arrangement is the provision of the power level control and indication arrangement, designated Channel 2 in the lower part of the drawing. With the switches in network 10 in the appropriate positions, the d-c energy from rectifier 21 is passed through network 10 and over input line 25, resistors 26, 27 and reference line 28 to energize a driver amplifier stage 30, which in turn passes its output pulses to a power amplifier stage 31. The energy from power amplifier 31 is then returned over output line 39 and network 10 to drive motor 11. In that the motor represents an inductive load, the pulse out-put from power amplifier 31 is averaged in the load inductance, and the duty cycle of the driver amplifier in effect regulates the motor speed. In turn, this duty cycle is set by potentiometer 32, connected in parallel with a Zener diode 33 near the input side of the driver amplifier stage 30. In one embodiment with a 12 volt d-c energization on line 25, Zener diode 33 was provided with an 8.2 volt rating so that current would only flow through resistors 26, 27 to energize driver amplifier 30 when the supply from rectifier 21 or battery 22 is sufficiently high to forward bias transistor 34, the emitter-collector path of which is coupled in series with a lamp 35 and the emitter-collector path of a second transistor 36. The out-put of the Schmitt trigger driver stage 30 is sensed, over diode 37 and resistor 38, so that transistor 36 is only rendered conductive when there is actually drive from the driver amplifier 30 to the power amplifier 31. Thus the illumination of lamp 35 indicates both that energy is being supplied to driver amplifier 30, and that this stage is in fact passing output current to the power amplifier.

As the setting of potentiometer 32 is varied, the duty cycle and the frequency of the Schmitt trigger circuit 30 is correspondingly modified and the average value of the signal supplied to the base of transistor 36 is varied. Thus the intensity of the radiation from lamp 35 is proportional to the duty cycle of the driver amplifier stage 30. A photocell 40 is positioned so that the radiation strikes it and provides a signal to an RMS meter 41 for a visual indication of the amplitude of the energy being supplied from the driver amplifier to the power amplifier. If desired, an alarm 42 can be coupled to the meter circuit to be energized if the energy transfer level drops below a predetermined minimum value. This can be done by a set of contacts on the meter itself, which contacts are movable to close a circuit at any preselected current level.

The third channel, in the upper portion of FIG. 1, provides for a supply of d-c energy from battery 22 in a right-to-left direction as viewed in the figure to energize the second motor 12. With the individual switches in switching network 10 in the appropriate positions, d-c energy from battery 22 passes over this network to energize high-frequency oscillator 45, which can be essentially the same type as oscillator or inverter 16 in the first channel. A-C energy is passed over primary winding 46 and a secondary winding 47 of transformer 20, rectified in a converter stage 48, filtered in stage 50 and then applied to energize motor 12. This allows for the alternate energization and the operation of a second motor, such as a universal type d-c motor. Details of a circuit suitable for Channel 3 are shown in FIG. 5, and will be described hereinafter.

DETAILED DESCRIPTION OF THE INVENTION

Circuit details of the a-c to d-c Channel 1 are shown in the left portion of FIG. 2. Single phase 120 volts, 60 hertz energy is received over conductors 13a, 13b and, when there is a ground wire, over 13c. These conductors are coupled over the connectors 52a, 52b and 52c to the corresponding circuit conductors 53, 54 and 55. Conductor 55 is connected directly to a chassis ground. The other conductors 52 and 53 are coupled to the input connections of input rectifier bridge 14, the output connections of which are coupled to the energizing conductors 56 and 57. A filter capacitor 58 is connected as shown between these conductors 56, 57.

At the input side of voltage reulator circuit 15, a series circuit comrising diodes 60, 61 and resistor 62 is connected between conductors 56, 57. The base of a PNP type transistor 63 is coupled to the common connection between diode 61 and resistor 62, and the emitter of this transistor is coupled through a resistor 64 to conductor 56. The collector of transistor 63 is coupled both to the base of an NPN type transistor 65 and to the collector of another NPN type transistor 66, the emitter of which is copuled through a Zener diode 67 to conductor 57. The collector of transistor 65 is coupled to conductor 56, and the emitter of transistor 65 is coupled to the base of another NPN type transistor 68, the emitter of which is coupled to conductor 70. A resistor 71 is connected between conductor 70 and the common connection between the emitter of transistor 66 and Zener diode 67. The base of transistor 66 is copuled over feedback conductor 24 to receive the voltage regulating signal. That is, transistor 66 acts as a variable impedance under the regulation of the signal on line 24 to effect a regulation in the output voltage level between conductors 70, 57 as a function of the feedback signal. This output voltage is smoothed by the filter capacitor 72 connected as shown between conductors 70 and 57.

In high frequency (about 30,000 hertz) oscillator circuit 16, resistors 73, 74 and capacitors 75, 76 are connected in series between conductors 70 an 57. The NPN type transistor 77 in this circuit has its collector coupled to conductor 70, and its base connected to the common connection between resistors 73, 74. Its emitter is coupled through a variable resistor 78 and a resistor 80 to a tap 81 on the primary widing 17. The lower end of this winding is copuled to conductor 57, and the upper end provides a feedback signal over conductor 82 to the common connection between capacitors 75, 76.

Variable resistor 78, coupled to the emitter of transistor 77, performs an important current-limiting function in this circuit. There is a certain back emf on the transformer primary winding between terminal 81 and the lower end of winding 17, and the current flow due to this voltage is limited by the variable resistor 78. It is noted that this current is not necessarily constant. As the load increases and the secondary winding 18 is loaded, current through the primary and thus through the oscillator circuit correspondingly increases. without excess loading the oscillator circuit 16 produces well-defined triangular pulses such as represented generally in FIG. 3A. Under heavy loading conditions, this wave shape gradually deteriorates as depicted generally in FIG. 3B, which is a graphical representation of interruption of the circuit which would otherwise maintain the voltage reference between the base and the emitter of transistor 77. Interruption of this circuit stops oscillation. Because the series regulator circuit 15 is a high impedance source, the field of transformer 20 collapses and nothing further occurs. Accordingly the importance of the variable resistor 78 in this circuit is manifest. FIG. 3C shows the collector current of transistor 77 due to the back emf caused by tank circuit 76, 17. Resistor 80 is chosen to prevent negative current flow through resistors 78 and 80. The elimination of this negative current prevents damage of transistor 77.

Considering now the feedback circuit from feedback winding 23 of transformer 20, the opposite ends of this winding are coupled over respective diodes 83, 84, and conductor 85 to the upper end of a potentiometer 86. The lower end of this potentiometer is coupled over a fixed value resistor 87 and conductor 88 to the center tap of secondary winding 23. A filter capacitor 90 is connected between conductors 85, 88 as shown to filter the rectified d-c voltage supplied to potentiometer 86. The level of the feedback signal is adjusted by setting the arm or movable tap of potentiometer 86 to regulate the level of the feedback signal applied over conductor 24 to the base of transistor 66 in the series regulator circuit.

The particular feedback arrangement is important for several reasons. For example, if the output of the series regulator 15 were sensed and this signal utilzied to regulate its operation, the Channel 1 circuit would not compensate either for losses in the circuit of oscillator 16, or for fluctuations in the load on the other side of secondary winding 18. Better regulation is thus achieved with this arrangement. The load voltage for charging the battery 22 can be compensated in this regulating arrangement. This is because changes in the load demand will provide a corresponding change in the flux density in the transformer core 20, effectively changing the signal fed back over line 24 to the series regulator 15.

Considering now the circuit including switching network 10, secondary winding 18 has its opposite end portions coupled through diodes 92, 93 and over conductor 94 to one fixed terminal 95 of a fixed-variable switch 96, which includes another fixed contact 97 and a movable contact portion 98. The movable contact 98 is ganged to another movable contact 100 of the same switch 96, shown engaging fixed contact 101 and displaceable to engage the other fixed contact 102 of this set. In the "variable" position of switch 96 as shown, the output power from power amplifier 31 is supplied over conductor 39 to conductor 103, and also to movable contact 100 of the fixed-variable switch 96. Conductor 103 is coupled to fixed contact 104 of a bypass switch 105, which includes a movable contact 106 shown engaging a fixed contact 107. In the position shown switch 105 completes the circuit for supplying energy over conductor 25 to energize the power amplifier 31, driver amplifier 30 and the other components shown in the lower portion of FIG. 1. While represented as a simple ground connection in FIG. 1, of course there is another d-c conductor for this energy supply and return circuit, which conductor is referenced 108 in FIG. 2. This circuit is returned over a diode 110, a meter 111, conductor 112 and a resistor 113 to the center tap connection of secondary winding 18. Conductor 112 is also coupled to the negative terminal of battery 22 and to two of the fixed connections of the forward reverse switch 114. This switch includes a first contact set with a movable contact 115 and a pair of fixed contacts 116, 117, and a second contact set with another movable contact 118, and fixed contacts 119 and 120. Conductor 112 is copuled to the fixed contacts 117 and 119. Fixed contact 120 of the lower set is coupled both to fixed contact 116, and to fixed contact 101 of the fixed-variable switch. All the switches shown in the upper right hand portion of FIG. 2 can be considered as individual switch components of the switching network referenced 10 in the general explanation of the system.

As shown switch 96 is in the "variable" position, in which the power level in the driver amplifier and power amplifier (FIG. 1) can be varied to control the motor speed. In this position, energy is supplied by battery 22 over contacts 97, 98, 106, 107 and conductor 25 to the Channel 2 components, including the driver amplifier 30 and power amplifier 31. The variable power level, regulated by the setting of potentiometer 32, is provided over output conductor 39 to switch contacts 100, 101, 116, 115, motor 11, contacts 118, 119 and conductor 112 back to the negative pole of the battery.

Thus the motor can drive a boat or other load and its speed will be maintained in accordance with the setting of potentiometer 32. If it is desired to drive the load at a constant speed, without the variable control of this potentiometer, movable contact 106 is displaced from its indicated position to engage fixed contact 104 and complete a bypass circuit over conductor 103 to energize the motor in an obvious manner.

To complete a circuit for charging battery 22 over the Channel 1 components shown in the left portion of FIG. 2, switch 96 is displaced so that movable contacts 98, 100 now engage fixed contacts 95 and 102. With d-c energy from the circuit coupled to the secondary winding 18 provided as shown, one side of the circuit is coupled over resistor 113 and conductor 112 to the negative pole of battery 22. The other connection is extended over conductor 94, contacts 95, 98, 106, 107, conductor 25, through the driver amplifier and power amplifier, over conductor 39, contacts 100 and 102, to the positive pole of battery 22. Of course if it is desired to bypass the controlled power circuit in the second channel and provide full power charging, movable contact 106 can be displaced to engage fixed contact 104 and effectively shunt the controllable power channel. The forward-reverse switch 114 operates in an obvious manner to reverse the effective polarity of the d-c energy supplied to motor 11, thus reversing its rotation and the direction in which the load is displaced.

Considering now the two-motor showing in FIGS. 4A and 4B, in FIG. 4A a rectifier circuit 21 is illustrated providing d-c energy between conductors 130 and 131. It will become apparent that this system, with that in FIG. 4B, can charge battery 22, energize "left" motor 11 and/or "right" motor 9 directly from the battery, or from the variable power level control depicted in FIG. 4B. It should be understood that the term "left," as used in conjunction with motor 11, indicates the motor 11 can be positioned on the left rear of a boat, with the right motor 9 positioned at the right rear. The terms left and right designate the motor positions with respect to each other at the stern. Thus if both motors are energized at the same level, the boat will move through the water evenly. If the left motor 11 is energized at a level greater than that of the right motor 9, then the craft will turn gradually to the right. The same principles are true if the left and right motors are installed in an automotive vehicle, in that a drive train on one side of the vehicle turning at a speed greater than that on the other side will cause the vehicle to turn. The same skid-steer principle is applicable to installation in a tracked vehicle, such as an amphibious vehicle or one with tank-like treads, and in underwater diving equipment powered with electric motors. Those skilled in the art will readily appreciate the universal application of these principles.

In the upper portion of FIG. 4B, a switching circuit 132 and a power amplifier circuit 133 provide energy at a controlled level over output conductor 134 for application through the illustrated switching network to left motor 11. In like manner a second switching circuit 135 and its corresponding power amplifier circuit 136 provide output power at a regulated level over conductor 137 for application, through the switching arrangement, to energize right motor 9. Because switching circuit 132 is the same as its counterpart 135, and power amplifier circuit 133 is in all respects identical to power amplifier circuit 136, the schematic details of the switching circuit and power amplifier for the left motor channel will suffice to explain circuit interconnection and operation for both.

With charge-run switch 140 in the run position as shown, on-off switch 141 can be closed to complete a circuit from the positive pole of battery 22 over switch 141, conductor 142, fixed contact 143 and movable contact 144 of the chargerun switch, conductor 146, diode 147 and resistor 148 to another energizing conductor 150. Energy is passed over conductor 150 to the other switching circuit 135 in the channel for the right motor 9. At the same time the negative pole of battery 22 is coupled over conductor 131 and diode 151 to common conductor 152 in the power amplifier and switching circuit for the left motor. The negative pole battery connection is also extended over conductor 153 to the capacitor 154 in the output stage of power amplifier 136. The connection of this capacitor and the inductor 155 will be understood from the explanation in connection with power amplifier 133.

Just to the left side of switching circuit 132, a Zener diode 156 is coupled between conductors 150 and 152 to provide a well regulated voltage for the switching circuits 132 and 135. A filter capacitor 157 is also coupled between conductors 150, 152.

In the right hand portion of switching circuit 132, a unijunction transistor 160 has its base one connection coupled through a resistor 161 to conductor 152, and its base two connection coupled through another resistor 162 to conductor 150. Its emitter is coupled to a junction point 163. A capacitor 164 is coupled between terminal 163 and conductor 152. A series circuit including a variable resistor 165 and a fixed value resistor 166 is coupled between conductor 150 and terminal 163. The charging circuit including capacitor 164, resistor 166 and the effective portion of variable resistor 165 determines the firing time of unijunction transistor 160, and regulates the frequency of the pulses to be supplied to the power amplifier circuit 133. Adjustment of the movable tap of variable resistor 165 effects a frequency adjustment of the system. The output pulses are supplied from terminal 163 over diode 167 to another common point 168. A resistor 170 is coupled between conductor 150 and terminal 168. The collector-emitter circuit of an NPN type transistor 171 is coupled in series between terminal 168 and common conductor 152. The base of transistor 171 receives a feedback signal over line 172 to regulate the effective impedance of this transistor and maintain regulation in this circuit.

Terminal 168 is also coupled to the base of another NPN type transistor 173, the emitter of which is coupled through a capacitor 174 to conductor 152. The collector of this transistor is coupled through a series circuit including resistors 175 and 176 to conductor 150. Another series circuit coupled between conductors 150 and 152 includes a diode 177, a PNP type transistor 178, and a resistor 180. A series circuit comprising variable resistor 181, and fixed value resistors 182 and 183 is coupled between conductor 152 and the common connection between diode 177 and the emitter of transistor 178. The base of transistor 178 is coupled to the common connection between resistors 175, 176. The collector of transistor 178 is coupled to one side of resistor 180, and over diode 184, conductor 185, and resistor 186, to the common connection between diode 167 and terminal 163. This is a feedback connection to stabilize operation of the switching circuit 132. In addition to the common connection between capacitor 174 and the emitter of transistor 173 is coupled to the common connection between resistors 182, 183.

Variable resistor 181 provides a duty cycle control. That is, its adjustment regulates the percentage of conduction, or "on" time, of transistors 173 and 178 of the total period which they would otherwise conduct by reasons of the pulses provided from unijunction transistor 160. Broken line 187 indicates a "ganged" or mechanical coupling connection between duty cycle adjust resistor 181 and frequency adjust resistor 165. It is emphasized that this is not a conventional ganged connection. In one embodiment found suitable for operating a low horsepower d-c motor, frequency adjust resistor 165 was set to provide control of frequency over a range of from 50 to 1,000 hertz. For the same system operation, the duty cycle adjustment was from zero to 100% of the pulse time. In accordance with an important aspect of the invention, the duty cycle ganged connection was established such that below the 10% setting, the frequency of the pulses from unijunction transistor 160 was automatically raised as the duty cycle value was reduced below 10%. This obviates an intermittent or stepping type movement of the d-c motor at low energization levels. By gradually increasing the frequency as the duty cycle is decreased below 10%, a smooth operation of the motor is maintained even at very low speed.

The output signals from switching circuit 132 is applied to power amplifier 133 by passing over conductor 190 to the base of an NPN type transistor 191, the emitter of which is coupled to conductor 152. The collector of transistor 191 is coupled through a series circuit including resistors 192 and 193 to conductor 146. A PNP type transistor 194 has its base coupled to the common connection between resistors 192, 193. Its emitter is coupled over resistor 195 to conductor 146, to diode 196 in parallel with resistor 195, to the base of another PNP type transistor 197, and over conductor 198 to the base of another PNP type transistor 200. The collector of transistor 194 is coupled to the common connection between an output smoothing inductor 201 and the collector of transistor 197, the emitter of which is coupled over a resistor 202 to conductor 146. The lower or output terminal of inductor 201 is coupled both to output conductor 134 and, over capacitor 203, to common conductor 131. The emitter of transistor 200 is coupled over a series circuit including resistors 204, 205 to conductor 146. A capacitor 206 is coupled in parallel with resistor 205. The collector of transistor 200 is coupled over a series circuit including resistor 207 and capacitor 208 to conductor 152. From the common connection between resistor 207 and capacitor 208 conductor 172 extends a feedback connection to the base of transistor 171 in switching circuit 132. The power amplifier circuit is straightforward. Those skilled in the art will appreciate that the signal received over conductor 190 is amplified to a higher power level and passed over inductor 201 and conductor 134, both to the different terminals in the switching network, and to the charge-run switch connections for left motor 11. Switching circuit 135 operates exactly the same way as does 132, and in fact receives energization over conductors 150, 152. The output signal from switching circuit 135 is supplied over conductor 210 to power amp 136. Conductor 210 is similar to the conductor 190 between switching circuit 132 and power amplifier 133. In the output portion of the power amplifier 136, capacitor 154 and output inductor 155 are placed similarly to the capacitor 203 and inductor 201 in the power amplifier 133. With this perspective the different switches and their interconnections will now be described.

It is initially noted that when energy is supplied over conductor 146 to the power amplifier 133 it is also passed over conductors 211 and 212 to the other power amplifier 136. Conductor 211 is coupled to the center or movable contact 213 of left-right switch 214, which also has fixed contacts 215, 216. Fixed contact 215 is connected to conductor 137, and fixed contact 216 is connected to conductor 134. A bypass switch 217 is provided as shown, with its movable contacts 218 and 219 both coupled to conductors 211 and 212. One fixed contact 220 of this switch is coupled to conductor 134, and the other fixed contact 221 is connected to conductor 137.

In FIG. 4A, charge-run switch 140 includes in addition to the contact set 143–145, two additional contact sets 222–224 for the left motor 11, and 225–227 for the right motor 9. In contact set 222–224, the movable contact 222 is coupled to conductor 134, fixed contact 223 is coupled over conductor 228 to conductor 142, and the other fixed contact 224 is coupled both to an upper fixed contact in the forward-reverse switch 230 and to a lower fixed contact in the same switch. The circuit details of the forward-reverse switch 230 for the left motor and the forward-reverse switch 231 for the right motor need not be described, for these double-pole, double-throw switches operate in a conventional manner to reverse the polarity of the voltage applied to energize the motor. For the other set of contacts for charge-run switch 140, movable contact 225 is coupled to conductor 137, fixed contact 226 is coupled over conductor 232 to conductor 142, and fixed contact 227 is coupled both to an upper contact and to a lower fixed contact of the forward-reverse switch 231 for the right motor 9.

When switch 141 is closed, energy from the positive pole of battery 22 is extended over conductor 142, contacts 143, 144, conductor 146, diode 147, resistor 148, and conductor 150 to energize power amplifier 133 and switching circuit 132 in the channel for energizing left motor 11. Energy is also extended from conductor 146 over conductors 211, 212 to power amplifier 136, and the switching circuit 135 is energized over conductors 150, 152. Depending upon the settings of frequency control 165 and duty cycle control 181, a variable d-c voltage is passed over inductor 201, conductor 134, contacts 222, 224, and the contacts of forward-reverse switch 230 to energize left motor 11. This circuit is completed over conductor 153 to the negative terminal of battery 22. Similarly the output energy from power amplifier circuit 136 passes over conductor 137, contacts 225, 227, the forward contacts of forward-reverse switch 231, the winding of motor 9, and conductor 153 back to battery 22.

If the energy level in the circuit including power amplifier 133 and switching circuit 132 is increased, the left motor is driven faster and the craft would turn to the right. To incrase the amount of turning to the right, turn switch 214 can be actuated so the movable contact 213 engages fixed contact 216, bypassing power amplifier 133 and switching circuit 132. With this switch closed, the energy from the battery flows over conductor 146, the conductor 211, contacts 213, 216 and conductor 134 to drive the left motor at the maximum available energy level. With bypass switch 217 actuated, both movable contacts 218, 219 engage their respective fixed contacts 221, 220 to run both motors at the maximum level. This bypass switch in effect bypasses the power amplifiers and switching circuits for both motors.

When it is desired to charge battery 22, charge-run switch 140 is displaced from the illustrated position so that movable contact 144 engages fixed contact 145, contact 222 now engages contact 223, and the other movable contact 225 engages fixed contact 226. Of course a-c energy must be supplied to the a-c to d-c channel (such as Channel 1 in FIG. 1), so that the output energy from rectifier 21 in FIG. 4A is applied betwen conductors 130, 131. The energy from conductor 130 is passed over contacts 145, 144, and conductor 146 to the power amplifier and switching circuits. The output energy from the bottom of choke 201 in power amplifier 133 passes over conductor 134, contacts 222, 223, conductor 228, and the contacts of switch 141 to the top of battery 22. Similarly the output from the other power amplifier 136 passes over conductor 137, contacts 225, 226, conductors 232, 142, and on-off switch 141 to the top of battery 22. The negative pole of battery 22 is connected back to an output conductor of rectifier 21. In this way the battery can be recharged when the craft is at an installation with suitable a-c energy.

FIG. 5 shows one suitable configuration of a system for providing a higher d-c voltage, such as 120 volts, for operating a universal motor load from a source such as battery 22. The system components can be readily sized to accomodate a 12 or 24 volt potential between positive input conductor 235 and the other input conductor 236. The oscillator or inverter section of this portion of the power supply includes three PNP type transistors 237, 238 and 240, which may be of germanium to handle the requisite power levels. The collectors of all three transistors are coupled to input conductor 236. The emitters of transistors 238, 240 are coupled through resistors 241 and 242 to the common terminal 243 of primary winding 244. The lower end of this winding is coupled to input connector 235 and to one plate of capacitor 245, the other plate of which is coupled both to the upper end of winding 244 and through a series circuit including another capacitor 246 and resistors 247, 248 to conductor 236. The base of transistor 237 is coupled to the common connection between resistors 247 and 248. This circuit operates in a well known manner when energized to pass an a-c voltage across transformer 250 and induce an a-c signal in secondary winding 251. This a-c signal is rectified in the rectifier bridge 252 to provide an output voltage between conductors 253, 254. A filter capacitor 255 is connected across these output conductors to minimize the ripple in the 120 volt energization for a universal motor. Such an arrangement can be used with an independent transformer 250, or it can be used as the Channel 3 circuit shown in the uppermost portion of FIG. 1. With such an arrangement the same system shown in FIG. 1 could be utilized with Channel 1 to energize a low voltage motor 11, and over the third channel to energize a 120 volt universal motor 12. Thus the flexibility of the system is apparent.

FIG. 6 shows another embodiment of the invention, in which a rheostat or variable resistor 260 replaces the Channel 2 power control and indication portion of the system shown in FIG. 1. In addition to rheostat 260 in FIG. 6, three switches 261, 262 and 263 are depicted to perform the functions accomplished by the switching network 10 in FIG 1. In the position shown of switch 261, full battery charging is accomplished from output rectifier 21 over conductor 264, the contacts of switch 261, and conductor 265 to battery 22. By displacing switch 261 to its alternate position, the power from output rectifier 21 is passed through the effective portion of rheostat 260 over conductor 266, and the contacts of switch 263 to battery 22. Switch 263 determines whether the battery or the motor will receive the energy passed over rheostat 260. The switch 262 has three positions. In the off position there is no output energy transferred from the battery 22 to any portion of the circuit. With switch 262 in its full position, all the battery energy is transferred over conductor 267, the contacts of switch 262, and conductor 268 to run motor 11 at the maximum level. With switch 262 displaced to the variable position, the energy is then passed from its contacts to the effective portion of variable resistor 260, over conductor 266, and the contacts of switch 263 (in its alternate position) to motor 11. It is recognized that this system is not as efficient as the system of FIG. 1, in that power is dissipated in the rheostat 260. In the system of FIG. 1, the only power transferred through the power control and indication Channel 2 is the amount required, as determined by the setting of potentiometer 32. Accordingly there is no waste of energy in the system of FIG. 1.

It is also noted that altough only a single "left" motor 11 and a single "right" motor 9 are shown in FIG. 4A, the motor 11 represents a group of motors for mounting on the left rear of the boat, and likewise motor 9 represents a group of 1, 2, or more motors. Accordingly in the appended claims the term "motor group" refers to a group of motors—1, 2 or more—connected together to add their total outputs and effectively function as one motor. It is apparent that no matter the number of additional motors connected in parallel with the indicated single motors 9 and 11, circuit interconnections and the system operation will be precisely the same.

While only particular embodiments of the invention have been disclosed and illustrated, it will be apparent to those skilled in the art the various modifications and alterations may be made therein. It is therefore the intention in the appended claims to cover all such modifications and alterations as may fall within the true spirit and scope of the invention.

What is claimed is:

1. A system for regulating energization of a d-c motor from a battery and also regulating charging of the battery, comprising:
   a switching network, coupled to the battery and to the motor, having a plurality of switches for regulating energy transfer to and from the battery and to the motor;
   a first channel, coupled between an input line for receiving a-c energy and the switching network, includg an input rectifier coupled to the input line, an oscillator coupled to the input rectifier for providing a-c energy, and an output rectifier connected to receive the a-c energy over a transformer and pass d-c energy to the switching network, thus providing d-c energy for charging the battery; and
   a second channel, connected to receive d-c energy at a constant level from the switching network and to pass d-c energy at a variable power level over the switching network to the motor, thus controlling motor speed.

2. An energization system as claimed in claim 1, and in which said second channel includes a driver amplifier and a power amplifier coupled in series to provide the variable power level d-c energy, a first sensing means connected between the switching network and the driver amplifier to provide a first control signal when d-c energy is being supplied to the driver amplifier, a second sensing means coupled to the output side of the driver amplifier for providing a second control signal when the driver is passing energy to the power amplifier, and indicating means coupled both to the first sensing means and to the second sensing means, for providing a normal indication only when both said first and second control signals are present.

3. An energization system as claimed in claim 1, in which said first channel includes a voltage regulator coupled in series between the input rectifier and the oscillator, a feedback winding on said transformer, and means for passing a feedback signal from the feedback winding to the voltage regulator, to provide effective regulation of the battery charging level notwithstanding changes in load and losses in the oscillator circuit.

4. An energization system as claimed in claim 1, and further comprising a third channel, connected between the switching network and a second d-c motor for energizing the second motor from the battery, including means coupled to the switching network for providing an a-c signal from energy supplied by the battery, additional windings on said transformer, a converter connected to receive a-c energy over said additional windings from the means for production the a-c signals, and a filter, coupled between the converter and the second motor, for reducing the a-c ripple in the d-c voltage passed to the motor.

5. A system for regulating energization of a d-c motor from a battery, and also regulating charging of the battery, comprising:
   a switching network, coupled to the battery and to the motor, including a plurality of switches for regulating the motor drive and battery charging functions;
   a first channel connected between an input line for receiving a-c energy and the switching network, including an input rectifier stage coupled to the a-c input line, an oscillator connected to operate and provide a-c energy upon energization by the input rectifier, a transformer having primary and secondary windings, with the primary winding coupled to the oscillator, an output rectifier coupled between the secondary winding and the switching network to pass d-c energy to the switching network when a-c energy is supplied to the input line; and
   a second channel for both controlling the amount of d-c power supplied to drive the motor or battery and to provide an indication such power is actually being supplied, comprising an input line coupled to the switching network for receiving a d-c voltage at a constant level, a driver amplifier stage and a power amplifier stage, both coupled to the input line for receiving constant level d-c energy, and an output line coupled between the power amplifier and the switching network to return d-c energy at a level determined by the operation of the driver amplifier stage, thus to afford regulation of the amount of energy for charging the battery and for driving the motor.

6. An energization system as claimed in claim 5, in which the first channed further includes a voltage regulator coupled between the input rectifier and the oscillator to afford regulation of the energy supplied to the oscillator, a feedback winding on said transformer, and means for passing a feedback signal from the feedback winding to the voltage regulator, thus affording regulation which is a function of the load imposed over the transformer and is virtually independent of the losses in the oscillator circuit.

7. An energization system as claimed in claim 5, and further comprising a third channel, connected between said switching network and a second d-c motor, comprising additional primary and secondary windings on said transformer, a second oscillator coupled between the switching network and said additional primary winding to receive d-c energy from the battery and pass a-c energy to the additional secondary windings, a converter coupled to the additional secondary winding for providing d-c energy, and a filter coupled between the converter and the second motor, thus providing energization of the second motor from the same battery.

8. An energization system as claimed in claim 5, and in which said second channel comprises a resistor coupled between said input line and a reference line, a first transistor having its emitter-base circuit coupled to opposite ends of said resistor, to provide current flow through the emitter-collector path of the first transistor when current is supplied over the resistor to the driver amplifier stage, and indicator means coupled to said first transistor for providing an operating signal when current is flowing over the first resistor to energize the driver amplifier.

9. A system as claimed in claim 8, and further comprising a Zener diode in said second channel, coupled between said reference line and ground, so that the operating signal is provided only when the energization to the driver amplifier is at a voltage level at least equal to the voltage drop across said Zener diode.

10. An energization system as claimed in claim 8, and further comprising a second transistor having its base coupled through a diode to the output line from the driver amplifier stage, and its emitter-collector path coupled in series with said indicator means and said first transistor, so that the operating signal from the indicator is provided only when energy is being supplied to the driver amplifier and the driver amplifier is also passing energy over its output line to the power amplifier stage.

11. An energization system as claimed in claim 10, in which the indicator means is a lamp, further comprising a photocell positioned to produce an output signal responsive to the incident light from said lamp, and a meter coupled to said photocell to provide an indication of the illumination level of the photocell, thus providing an indication of the operating level of the driver amplifier stage.

12. An energization system as claimed in claim 11, and further comprising an alarm, connected for energization when the operating indication on said meter drops below a predetermined minimum level.

13. A system for regulating energization of a pair of d-c motor groups from a battery and also for regulating charging of the battery, comprising:
a switching network, coupled to the battery and to both motor groups, having a plurality of switches for regulating energy transfer to and from the battery and to the motor groups;
a first channel, connected to receive d-c energy from a pair of input d-c lines and to pass output a-c energy to the switching network, including a first switching circuit connected to provide a pulse signal, and a first power amplifier circuit connected to amplify the pulse signal for passage through the switching network, thus energizing one of the two motor groups; and
a second channel, connected to receive d-c energy over the two input d-c lines and to pass output a-c energy to the switching netowork, including a second switching circuit connected to provide a pulse signal when energized by the d-c voltage, and a second power amplifier circuit connected to amplify the pulse signal for passage through the switching network to energize the second of the two motor groups, thus providing drive for both motor groups in the system.

14. An energization system as claimed in Claim 13, and further comprising a left-right steering switch connected in said switching network, including a movable contact coupled to one of the d-c input conductors, and a pair of fixed contacts each of which is coupled to a different conductor for energizing one of the two motor groups, so that closure of the left-right switch in one position energizes one of the motor groups at full level and in the other position energizes the other of the motor group at its full level, to provide a steering function.

15. An energization system as claimed in claim 13, and further comprising a bypass switch connected in said switching network, effective when closed to shunt both the first and second channels to pass full d-c energization from the input conductors directly to the motor groups for full speed operation.

16. An energization system as claimed in claim 13, and further comprising frequency adjusting means in the switching circuit of each channel, operable to adjust the frequency of the pulses provided to the power amplifier, a duty cycle adjust means in each switching circuit, operable to regulate the portion of each pulse actually passed to the power amplifier, and means for intercoupling the duty cycle adjust and frequency adjusting means so that at the lower end of the duty cycle adjust range, the frequency of the pulses is gradually incrased to obviate intermittent actuation of the d-c motors.

17. An energization system as claimed in claim 13, and further comprising a third channel, connected to receive a-c energy over an input line and provide d-c energy over a rectifier circuit, and a charge-run switch in said switching network, operable in one position to pass d-c energy from the battery to the first and second channels and in the second position to pass energy from the rectifier circuit to the battery, thus affording a charge function in the system.

18. A system for regulating energization of a d-c motor from a battery and also regulating charging of the battery, comprising:

a switching network, coupled to the battery and to the motor, having a plurality of switches for regulating energy transfer to and from the battery and to the motor;

a first channel, coupled between an input line for receiving a-c energy and the switching network, including an input rectifier coupled to the input line, an oscillator coupled to the input rectifier for providing a-c energy, and an output rectifier connected to receive the a-c energy over a transformer and pass d-c energy to the switching network, thus providing d-c energy for charging the battery; and a second channel, including a rheostat connected to the switching network, for passing d-c energy at a variable power level, depending upon the setting of the rheostat, to the motor or to the battery.

* * * * *